United States Patent
Wang

(10) Patent No.: US 8,339,440 B2
(45) Date of Patent: Dec. 25, 2012

(54) METHOD AND APPARATUS FOR CONTROLLING MULTIPOINT CONFERENCE

(75) Inventor: Jing Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 199 days.

(21) Appl. No.: 12/951,909

(22) Filed: Nov. 22, 2010

(65) Prior Publication Data

US 2011/0063407 A1    Mar. 17, 2011

Related U.S. Application Data

(63) Continuation of application No. PCT/CN2009/071860, filed on May 20, 2009.

(30) Foreign Application Priority Data

May 23, 2008   (CN) .......................... 2008 1 0112398

(51) Int. Cl.
*H04N 7/14*   (2006.01)

(52) U.S. Cl. ............... 348/14.09; 348/14.08; 348/14.12; 348/14.13

(58) Field of Classification Search .... 348/14.01–14.16; 370/260–261; 709/204, 205; 715/753
See application file for complete search history.

(56) References Cited

U.S. PATENT DOCUMENTS

| | | | |
|---|---|---|---|
| 5,978,514 A | 11/1999 | Yamaguchi et al. | |
| 7,830,409 B2 | 11/2010 | Hwang et al. | |
| 2003/0231600 A1* | 12/2003 | Polomski | 370/263 |
| 2005/0088514 A1 | 4/2005 | Deleam et al. | |
| 2005/0132412 A1 | 6/2005 | Richardson et al. | |
| 2006/0087553 A1* | 4/2006 | Kenoyer et al. | 348/14.08 |
| 2007/0250308 A1 | 10/2007 | Lee et al. | |

FOREIGN PATENT DOCUMENTS

| | | |
|---|---|---|
| CA | 2615459 A1 | 1/2007 |
| CN | 1332575 A | 1/2002 |
| CN | 101010729 A | 8/2007 |
| CN | 101068366 A | 11/2007 |
| CN | 101147400 A | 3/2008 |

(Continued)

OTHER PUBLICATIONS

Extended European Search Report issued in corresponding European Patent Application No. 09749456.1, mailed Jun. 9, 2011.

(Continued)

*Primary Examiner* — Melur Ramakrishnaiah
(74) *Attorney, Agent, or Firm* — Brinks Hofer Gilson & Lione

(57) ABSTRACT

A method and an apparatus for controlling a multipoint conference are disclosed. The method includes: determining resolution-layered coding parameters of each terminal, and sending them to their corresponding terminals; receiving the code streams sent by each terminal, selecting code streams to be displayed by each terminal among the received code streams according to the display requirements of each terminal, and transcoding or mapping the selected code streams to the code streams decodable by the terminal; and sending the code streams decodable by each terminal to their corresponding terminals. The embodiments of the present invention use an MCU to control the resolution-layered coding, and therefore, the system can include both the terminal supporting the layering protocol and the terminal supporting no layering protocol. In addition, the calculation is reduced, and the system efficiency is improved.

16 Claims, 2 Drawing Sheets

FOREIGN PATENT DOCUMENTS

| | | | |
|---|---|---|---|
| CN | 101257607 | A | 9/2008 |
| CN | 101588252 | A | 11/2009 |
| EP | 1320216 | A1 | 6/2003 |
| JP | 2004187170 | A | 7/2004 |
| JP | 2004260362 | A | 9/2004 |
| JP | 2005521308 | A | 7/2005 |
| JP | 2005223430 | A | 8/2005 |
| JP | 2005333358 | A | 12/2005 |
| JP | 2005341075 | A | 12/2005 |
| JP | 2006014242 | A | 1/2006 |
| JP | 2007074221 | A | 3/2007 |
| WO | WO 2007/076486 | A2 | 7/2007 |
| WO | WO 2008/051041 | A1 | 5/2008 |
| WO | WO 2008/060262 | A1 | 5/2008 |
| WO | WO 2009/140913 | A1 | 11/2009 |

OTHER PUBLICATIONS

Gharavi et al., "Video Coding and Distribution Over ATM for Multipoint Teleconferencing", Bell Communications Research, Inc., IEEE 1993. XP 10109570A.

Written Opinion of the International Searching Authority issued in corresponding PCT Patent Application No. PCT/CN2009/071860, mailed Sep. 3, 2009.

Gharavi et al., "Video Coding and Distribution Over ATM for Multi-Point Teleconferencing" IEEE 1993.

Office Action issued in corresponding Japanese Patent Application No. 2011-509845, mailed Sep. 25, 2012.

* cited by examiner

METHOD AND APPARATUS FOR CONTROLLING MULTIPOINT CONFERENCE

CROSS-REFERENCE TO RELATED APPLICATIONS

This application is a continuation of International Application No. PCT/CN2009/071860, filed on May 20, 2009, which claims priority to Chinese Patent Application No. 200810112398.2, filed on May 23, 2008, both of which are hereby incorporated by reference in their entireties.

FIELD OF THE APPLICATION

The present application relates to telecommunications technologies, and in particular, to a method and an apparatus for controlling a multipoint conference.

BACKGROUND OF THE APPLICATION

Currently, communication technologies are widely applied in the image transmission field. An important application in the image transmission field is videoconferencing including ordinary videoconference communication that involves multiple terminals concurrently, and continuous presence videoconference that displays video information of multiple terminals in the screen of one terminal concurrently.

In the ordinary videoconference application, a videoconference system may include terminals that have different processing capabilities, for example, high definition terminal (generally, 720P that indicates 1280×720 pixels, progressive scanning, or higher definition), standard definition terminal (generally, 4CIF that indicates 704×576 pixels), and general terminal (generally, CIF that indicates 352×288 pixels). When terminals of different processing capabilities attend a conference simultaneously, the image transmission capabilities of the terminals need to be coordinated so that the screen of every terminal can display pictures appropriately.

A method for coordinating the image transmission capabilities of all terminals includes: a Multipoint Control Unit (MCU) for controlling terminals in the videoconference system receives the resolution capability information of each terminal, and applies the common highest capability of all terminals to the conference; and the terminals in the videoconference encode and decode images according to the negotiated common highest capability. However, in the case that all terminals in the videoconference system employ the negotiated common highest capability for convening the conference, only low-resolution images are presented when the images are transmitted between the terminals of high resolution if one low-resolution terminal exists.

Another method for coordinating the image transmission capabilities of all terminals includes: The MCU performs adaptation and transcoding for the code streams in this way: The MCU decodes a received high-spatial-resolution code stream, downscale the decoded image into a low-resolution image, encodes the low-resolution image to obtain the code stream of the low-resolution image, and sends the code stream of the low-resolution image to the terminal that needs to display the image at low resolution. However, this method involves decoding code stream and downscaling of every high-resolution image, and coding of low-resolution image, thus leading complicated calculation and low efficiency.

As shown in FIG. 1, a videoconference system in the prior art includes: terminal 1 to terminal N, and an MCU for connecting the terminals. The MCU may be stand-alone, or embedded into a terminal.

A process of convening a conference with a videoconference system shown in FIG. 1 includes the following steps:

Step 1: The MCU in the system determines the common highest conference capability of all terminals in the system, and sends the determined common highest conference capability to every terminal in the system.

Step 2: After knowing the common highest conference capability, each terminal in the system encodes the image according to the common highest conference capability, and sends the code stream.

Step 3: The MCU in the system receives the code stream sent by the terminal, and transmits the code stream to the terminals that need to receive the code stream.

This method has the following drawback: As long as one low-resolution terminal exists, only low-resolution image is presented even if the image is transmitted between high-resolution terminals.

Another process of convening a conference with a videoconference system shown in FIG. 1 includes the following steps:

Step 1: An MCU in the system records the conference capability of every terminal in the system.

Step 2: When the MCU finds that the capability of the terminal receiving the code stream does not match the capability of the terminal sending the code stream, the MCU decodes the code stream sent by the terminal sending the code stream, encodes the image according to the capability of the terminal receiving the code stream, and transmits the code stream to the terminal receiving the code stream.

This method has the following drawback: decoding and encoding are required. Therefore, calculation is complicated and efficiency is low.

A third process of convening a conference with a videoconference system shown in FIG. 1 includes the following steps:

An MCU in the system receives a code stream of a large picture, and forwards the code streams of the large picture to the terminal that displays only the large picture. For the terminal that needs to display multiple pictures that include this picture, namely, for the terminal that needs to display multiple small pictures, the MCU decodes the code stream, downscales the image deriving from the decoding to the size of a subpicture, combines the downscaled image with other subpictures into a large picture, encodes the combined large picture, and sends the code stream of the combined large picture to the terminal that needs to display the image.

This method has the following drawback: each subpicture needs to be decoded and downscaled and the combined large picture needs to be encoded. Therefore, calculation is complicated, and efficiency is low.

SUMMARY OF THE APPLICATION

The embodiments of the present application provide a method and an apparatus for controlling a multipoint conference to support display requirements of terminals of different display capabilities in the system.

The technical solution under the present application is as follows:

In an embodiment, a method for controlling a multipoint conference is provided. The method includes:

determining resolution-layered coding parameters of each terminal, and sending them to their corresponding terminals; and receiving code streams sent by each terminal; selecting a code stream for each terminal among the received code streams according to display requirements of each terminal, and transcoding or mapping the selected code stream to the code stream decodable by the terminal; and sending the code stream to the corresponding terminal.

An MCU provided in an embodiment includes:

a first processing unit, configured to: determine resolution-layered coding parameters of each terminal, and send them to their corresponding terminals; and a second processing unit, configured to: select a code stream to be displayed by each terminal among the received code streams, and transcode or map the selected code stream to the code stream decodable by the terminal; and send the code stream to the corresponding terminal.

A multipoint videoconferencing system provided in an embodiment includes:

an MCU, configured to: determine resolution-layered coding parameters of each terminal, and send them to the corresponding terminal; select a code stream to be displayed by each terminal among the received code streams, and transcode or map the selected code stream to the code stream decodable by the corresponding terminal; and send the decodable code stream to the corresponding terminal; and a terminal, configured to: perform resolution-layered coding on an image to be sent according to the received resolution-layered coding parameters, and send the coded stream; and decode the received code stream.

The technical solution disclosed uses an MCU to control resolution-layered coding. Therefore, the terminal that supports the layering protocol and the terminal that does not support the layering protocol can coexist in the system. In addition, the calculation is reduced, and the system efficiency is improved.

DETAILED DESCRIPTION OF THE EMBODIMENTS

Figure 1:
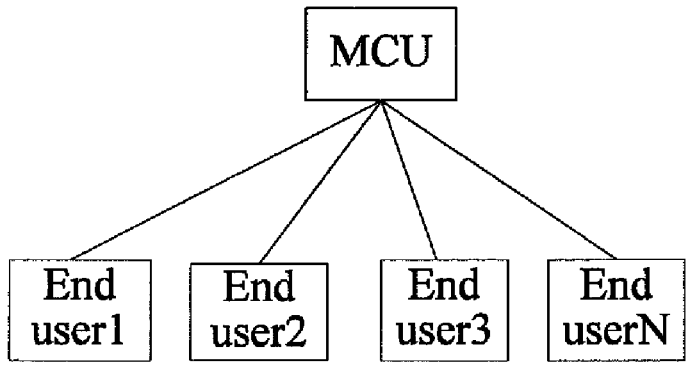
FIG. 1 shows a structure of a videoconference system in the prior art.
Figure 2:
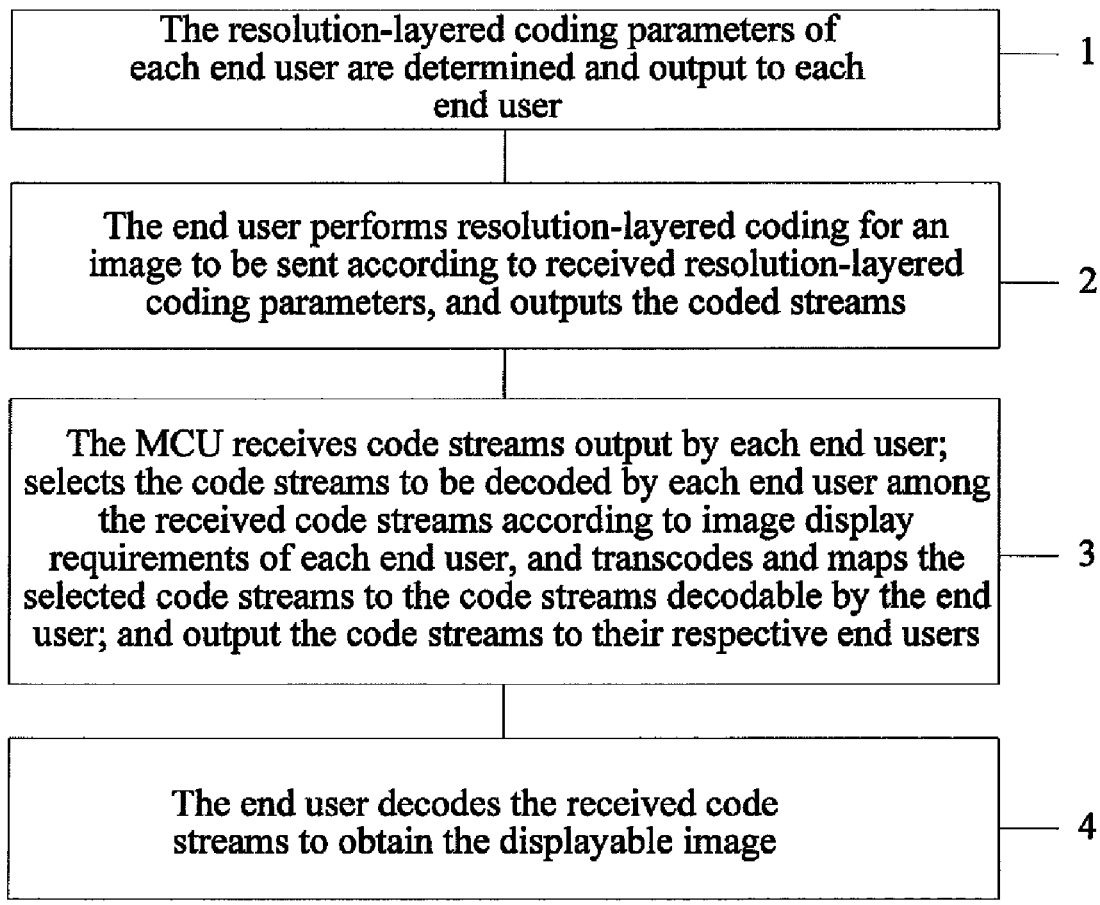
FIG. 2 shows a process of the first embodiment.

The first embodiment is a codec method. As shown in FIG. 2, the method includes the following steps:

Step 1: Resolution-layered coding parameters of each terminal are determined and sent to the corresponding terminal. The entity that performs this step may be an MCU for controlling every terminal in the system.

Step 2: A terminal performs resolution-layered coding on an image to be sent according to the received resolution-layered coding parameters, and sends the code stream. The code stream may be sent to the MCU.

Step 3: An entity receives code streams sent by each terminal, selects a code stream to be decoded by each terminal among the received code streams according to image display requirements of each terminal, transcodes or maps the selected code stream to the code stream decodable by the terminal, and sends the decodable code stream to the corresponding terminal. The entity that performs this step may be the MCU.

Step 4: The terminal decodes the received code stream to obtain the displayable image.

The resolution-layered coding parameters may include: resolution-layered coding parameters determined by the Scalable Video Coding (SVC) protocol; or resolution-layered coding parameters determined by the H263 protocol.

This embodiment is applicable to an ordinary video application, in which all terminals communicate simultaneously, and applicable to a continuous presence video application, in which video information of multiple terminals is displayed in the screen of one terminal simultaneously. In the following detailed description, the second embodiment is about the ordinary video application, and the third embodiment is about the continuous presence video application.

The second embodiment includes the following steps:

Step 1: The elementary-layer resolution of each terminal is determined. The entity that performs this step may be the MCU for controlling every terminal in the system. In the case that the elementary-layer resolution is preset, it is necessary to confirm that the preset elementary-layer resolution is not higher than the highest decoding resolution of any terminal. In the case that the elementary-layer resolution is not preset, the elementary-layer resolution determined by the MCU may be the common highest resolution among the received decoding resolutions of all terminals in the system.

Step 2: The elementary-layer coding standard, the number of enhanced coding layers, the enhanced-layer resolution, and the enhanced-layer coding standard of each terminal are determined according to the determined elementary-layer resolution, display requirements of each terminal, and preset resolution-layered coding standard, and are sent to their corresponding terminals.

For the terminal whose resolution is equal to the elementary-layer resolution, it is determined that a coding protocol (coding standard) of the terminal is the elementary-layer coding protocol, and the coding resolution is the elementary-layer resolution. In this case, the preset elementary-layer coding standard and the elementary-layer resolution are sent to only this terminal.

For the terminal whose resolution is higher than the elementary-layer resolution and that is incapable of layered coding, it is determined that a coding protocol of the terminal is the elementary-layer coding protocol, and the coding resolution is the elementary-layer resolution. In this case, the preset elementary-layer coding standard and the elementary-layer resolution are sent to only this terminal.

For the terminal whose resolution is higher than the elementary-layer resolution and that is capable of layered coding, it is determined that a coding protocol of the terminal is the layered coding protocol, the elementary-layer coding resolution is the elementary-layer resolution, and the enhanced-layer parameters may be determined in the following way: If the resolution is higher than the common highest capability, and at least two resolutions supported by the terminal exist, each resolution corresponds to an enhanced layer; and/or, the resolutions are clustered, and each clustered resolution corresponds to an enhanced layer.

Elementary-layer coding standards include Advanced Video Coding (AVC) and H263, and the enhanced-layer coding standards include SVC and H263.

Step 3: The terminal performs resolution-layered coding according to the received elementary-layer resolution, elementary-layer coding standard, number of enhanced coding layers, enhanced-layer resolution, and enhanced-layer coding standard, and sends the coded streams. If the terminal receives only the elementary-layer coding standard and the elementary-layer resolution, the image is encoded according to the elementary-layer coding standard. If the terminal receives the elementary-layer coding standard, the elementary-layer resolution, the number of enhanced coding layers, the enhanced-layer resolution, and the enhanced-layer coding standard, the image is encoded according to the elementary-layer coding standard, the elementary-layer resolution, the number of enhanced coding layers, the enhanced-layer resolution, and the enhanced-layer coding standard.

Step 4: The code streams sent by each terminal are received, the code streams to be decoded by each terminal are determined according to the preset decoding requirement of the terminal, and the code streams to be decoded by each terminal are transcoded into the code streams decodable by each terminal according to the code stream decoding capability of each terminal.

That is, for the terminal whose resolution is equal to the elementary-layer resolution, the elementary-layer code stream to be decoded is selected; for the terminal whose resolution is higher than the common highest capability and that is capable of layered decoding, the layered code stream (the elementary-layer code stream and the enhanced-layer code stream) to be decoded is selected; or the layered code stream that include the elementary layer and the enhanced layer are transcoded or mapped to the code stream of the elementary-layer coding standard; for the terminal whose resolution is higher than the common highest capability and that is incapable of layered decoding, the elementary-layer code stream to be decoded are selected; or, the layered code stream that include the elementary layer and the enhanced layer is transcoded or mapped to the code stream of the elementary-layer coding standard.

Transcoding or mapping may be encoding after complete decoding, and may be direct adjustment of the prediction coefficients and the corresponding adjustment of syntax and semantics, without involving complicated transformation calculation or introducing drift errors. Finally, the obtained code streams are sent to each corresponding terminal.

For example, the terminals existent in the system are terminal 1, terminal 2, terminal 3, and terminal 4, and the MCU receives the code streams sent by each terminal. If the preset image display requirement of the terminals is: terminal 4 displays the image sent by terminal 1, the MCU sets the code streams sent by terminal 1 as the code streams to be decoded by terminal 4. In the case that terminal 4 can decode only the code streams encoded according to the AVC standard (namely, AVC code streams), the MCU selects the elementary-layer AVC code streams to be decoded if terminal 1 sends SVC code streams; or, the MCU transcodes or maps the SVC code streams to the AVC code streams and sends the code streams. In the case that terminal 4 can decode SVC code streams, if terminal 1 sends SVC code streams, the MCU may send the SVC code streams directly; or, the MCU transcodes or maps the SVC code streams to the AVC code streams and then sends the code streams.

By using the method for controlling a multipoint conference control, which is provided in this embodiment, the system can include both the terminal supporting the layering protocol and the terminal supporting no layering protocol, the calculation is reduced, and the system efficiency is improved.

The MCU in this embodiment may be an MCU set on an terminal in the videoconference system, or a stand-alone MCU in the system.

The following describes the second embodiment, assuming that the videoconference system includes terminal 1, terminal 2, terminal 3, and terminal 4; terminal 1 includes an MCU, and the preset resolution-layered coding standard is SVC standard. Terminal 1 is capable of decoding CIF, 4CIF, and 720P, and needs to display the images transmitted by terminal 2 and decode SVC code streams. The decoding resolution of terminal 2 is the lowest. Terminal 2 is capable of decoding CIF, and needs to display the images transmitted by terminal 3 and decode only AVC code streams. Terminal 3 is capable of decoding CIF and 4CIF, and needs to display the images transmitted by terminal 4 and decode SVC code streams. Terminal 4 is capable of decoding CIF, 4CIF, and 720P, and needs to display the images transmitted by terminal 1 and decode SVC code streams. If an enhanced layer method is applied, namely, the resolution is greater than the elementary-layer resolution, at least two resolutions supported by the terminal exist, and each resolution corresponds to an enhanced layer, the implementation process of the system includes the following steps:

Step 1: The MCU receives the decoding resolution capability sent by each terminal in the videoconference system, and determines that the elementary-layer resolution is the decoding resolution of terminal 2.

Step 2: The MCU determines the coding mode of each terminal in the videoconference system according to the determined elementary-layer resolution, display requirements of each terminal, and the preset SVC resolution-layered coding standard, and sends the coding mode of each terminal to the corresponding terminal. For terminals 1, 3, and 4, the elementary layer uses the AVC standard for coding, and the coding resolution is the elementary layer resolution. The enhanced layer uses the SVC standard for coding, and the number of enhanced coding layers is determined according to these criteria: The resolution is greater than the elementary layer resolution, at least two resolutions supported by the terminal exist, and each resolution corresponds to an enhanced layer. Therefore, the number of enhanced coding layers is 2, the resolution of enhanced layer 1 is 4CIF, and the resolution of enhanced layer 2 is 720P. For terminal 2, the elementary layer uses the AVC standard for coding, and the coding resolution is the elementary layer resolution (namely, CIF), and no enhanced layer exists. For terminal 3, the elementary layer uses the AVC standard for coding, the coding resolution is the elementary layer resolution (namely, CIF), one enhanced layer exists, and the resolution of enhanced layer 1 is 4CIF. For terminal 1, the elementary layer uses the AVC standard for coding, and the coding resolution is the elementary layer resolution (namely, CIF), two enhanced layer exists, the resolution of enhanced layer 1 is 4CIF, and the resolution of enhanced layer 2 is 720P.

Step 3: Each terminal encodes the image according to the received coding mode, and sends the coded streams to the MCU. That is, terminal 1, terminal 3, and terminal 4 send SVC code streams, and terminal 2 sends AVC code streams.

Step 4: After receiving the code streams transmitted by each terminal, the MCU selects the code streams according to the decoding capability of the terminal, and transcodes the selected code streams and sends them. That is, the code streams (AVC code streams) transmitted by terminal 2 are sent to terminal 1 directly; among the code streams (SVC code streams) transmitted by terminal 3, the elementary-layer AVC code streams are selected and sent to terminal 2; among the code streams (SVC code streams) transmitted by terminal 4, the code streams of the elementary layer and the code streams of enhanced layer 1 are selected and sent to terminal 3; among the code streams (SVC code streams) transmitted by terminal 1, the code streams of the elementary layer, the code streams of enhanced layer 1, and the code streams of enhanced layer 2 are selected and sent to terminal 4.

Step 5: Each terminal decodes the received code streams.

If the enhanced layer method with clustered resolution is applied, the implementation process of the system includes the following steps:

Step 1: The MCU receives the decoding resolution capability sent by each terminal in the videoconference system, and determines that the elementary-layer resolution is the decoding resolution of terminal 2.

Step 2: The MCU determines the coding mode of each terminal in the videoconference system according to the determined elementary-layer resolution, display requirements of each terminal, and the preset SVC resolution-layered coding standard, and sends the coding mode of each terminal to the corresponding terminal. For terminal 1, terminal 3, and terminal 4, the elementary layer uses the AVC standard for coding, and the coding resolution is the elementary layer resolution. The enhanced layer uses the SVC standard for coding, and the number of enhanced coding layers is determined according to these criteria: The resolution is greater than the elementary layer resolution, and at least two resolution clusters supported by the terminal exist. Therefore, the number of enhanced coding layers is 1; the resolution of enhanced layer 1 is 4CIF. For terminal 2, the elementary layer uses the AVC standard for coding, the coding resolution is the elementary layer resolution (namely, CIF), and no enhanced layer exists.

Step 3: Each terminal encodes the image according to the received coding mode, and sends the coded streams to the MCU. That is, terminal 1, terminal 3, and terminal 4 send SVC code streams, and terminal 2 sends AVC code streams.

Step 4: After receiving the code streams transmitted by each terminal, the MCU selects the code streams according to the decoding capability of the terminal, and transcodes the selected code streams and sends them. That is, the code streams (AVC code streams) transmitted by terminal 2 are sent to terminal 1 directly; among the code streams (SVC code streams) transmitted by terminal 3, the elementary-layer AVC code streams are selected and sent to terminal 2; among the code streams (SVC code streams) transmitted by terminal 4, the code streams of the elementary layer and the code streams of enhanced layer 1 are selected and sent to terminal 3.

Step 5: Each terminal decodes the received code streams.

The third embodiment includes the following steps:

Step 1: The resolution capability information sent by each terminal is received. The subpicture resolution and the combo picture resolution are determined according to the resolution capability information and the display requirements of each terminal. The entity that determines the resolutions may be an MCU in the system.

Step 2: The elementary-layer coding standard, the number of enhanced coding layers, and the enhanced-layer coding standard of each terminal are determined according to the determined subpicture resolution, the combo picture resolution, and the preset resolution-layered coding standard; and are sent to their corresponding terminals.

For the terminal whose resolution is equal to the subpicture resolution, it is determined that a coding protocol of the terminal is the elementary-layer coding protocol, and the coding resolution is the subpicture resolution.

For the terminal whose resolution is higher than the subpicture resolution and that is incapable of layered coding, it is determined that a coding protocol of the terminal is the elementary-layer coding protocol, and the coding resolution is the subpicture resolution.

For the terminal whose resolution is higher than the subpicture resolution and that is capable of layered coding, it is determined that a coding protocol of the terminal is the layered coding protocol, the elementary-layer coding resolution is the subpicture resolution, and the enhanced-layer coding resolution is the combo picture resolution.

Step 3: The terminal performs resolution-layered coding according to the received elementary-layer resolution, elementary-layer coding standard, number of enhanced coding layers, enhanced-layer resolution, and enhanced-layer coding standard, and sends the coded streams. If the terminal receives only the elementary-layer coding standard and the elementary-layer resolution, the image is encoded according to the elementary-layer coding standard. If the terminal receives the elementary-layer coding standard, the elementary-layer resolution, the number of enhanced coding layers, the enhanced-layer resolution, and the enhanced-layer coding standard, the image is encoded according to the elementary-layer coding standard, the elementary-layer resolution, the number of enhanced coding layers, the enhanced-layer resolution, and the enhanced-layer coding standard.

Step 4: The code streams sent by each terminal are received. For the terminal that needs to display multiple small pictures, the selected code stream(s) for decoding and displaying are combined into an elementary-layer code stream directly; and/or, the selected code stream(s) for decoding are decoded, and the decoded pictures are combined into a large picture. Afterward, the large picture is encoded to obtain an elementary-layer code stream.

Depending on the decoding capability, the terminal that needs to display a large picture works in two modes: For the terminal capable of layered decoding, the subpicture code streams to be decoded and enhanced-layer code streams to be decoded are selected; or, the layered code streams that include the subpicture code streams and the enhanced-layer code streams are transcoded or mapped to the code streams of the elementary-layer coding standard.

For the terminal incapable of layered decoding, the layered code streams that include the subpicture code streams and the enhanced-layer code streams are transcoded or mapped to the code streams of the elementary-layer coding standard.

For example, in the third embodiment, the multipicture videoconference includes terminal 1, terminal 2, terminal 3, terminal 4, and MCU, and the preset coding standard is SVC. Terminal 1 is capable of decoding CIF, 4CIF, and 720P, and needs to display the images transmitted by terminal 2 and decode SVC code streams. The decoding resolution of terminal 2 is the lowest. Terminal 2 is capable of decoding CIF, and needs to display the images transmitted by terminal 3 and decode only AVC code streams. Terminal 3 is capable of decoding CIF and 4CIF, and needs to display the images transmitted by terminal 1, terminal 2, and terminal 4 and decode SVC code streams. Terminal 4 is capable of decoding CIF, 4CIF, and 720P. If an enhanced layer method is applied, namely, the resolution is greater than the elementary-layer resolution, at least two resolutions supported by the terminal exist, and each resolution corresponds to an enhanced layer, the implementation process of the system includes the following steps:

Step 1: The MCU receives the decoding resolution capability sent by each terminal in the videoconference system, and determines that the subpicture resolution is CIF and the combo picture resolution is 4CIF.

Step 2: The layering parameters of each terminal are determined, and the coding mode of each terminal is sent to the corresponding terminal. For terminal 1, terminal 3, and terminal 4, the elementary layer uses the AVC standard for coding, and the coding resolution is the subpicture resolution "CIF". The enhanced layer uses the SVC standard for coding, and the number of enhanced coding layers is determined according to these criteria: The resolution is greater than the elementary-layer resolution, at least two resolutions supported by the terminal exist, and each resolution corresponds to an enhanced layer. Therefore, the number of enhanced coding layers is 2, the resolution of enhanced layer 1 is 4CIF, and the resolution of enhanced layer 2 is 720P. For terminal 2, the elementary layer uses the AVC standard for coding, and the coding resolution is the subpicture resolution (namely, CIF), and no enhanced layer exists.

Step 3: Each terminal encodes the image according to the received coding mode, and sends the coded streams to the MCU. That is, terminal 1, terminal 3, and terminal 4 send SVC code streams, and terminal 2 sends AVC code streams.

Step 4: After receiving the code streams transmitted by each terminal, the MCU transcodes the code streams according to the decoding capability and display requirements of the terminal, and sends them. That is, because terminals 1 and 2 do not need to display small pictures, the processing of the code streams directed to terminals 1 and 2 is the same as the processing in the second embodiment, namely, the code streams (AVC code streams) transmitted by terminal 2 are sent to terminal 1 directly; among the code streams (SVC code streams) transmitted by terminal 3, the elementary-layer AVC code streams are selected and sent to terminal 2.

Because terminal 3 needs to display the combo picture, the MCU may select the elementary-layer AVC code streams transmitted by terminal 1, AVC code streams transmitted by terminal 2, and elementary-layer AVC code streams transmitted by terminal 4 directly to make up an elementary-layer AVC code stream of a large picture, and send it to terminal 3.

Step 5: Each terminal in the multipicture videoconference system decodes the received code streams. For terminal 3 that needs to display combo pictures, the received elementary-layer code streams of the combo picture are decoded.

If the enhanced layer method with clustered resolution is applied, the implementation process of the system includes the following steps:

Step 1: The MCU receives the decoding resolution capability sent by each terminal in the videoconference system, and determines that the subpicture resolution is CIF and the combo picture resolution is 4CIF.

Step 2: The layering parameters of each terminal are determined, and the coding mode of each terminal is sent to the corresponding terminal. For terminal 1, terminal 3, and terminal 4, the elementary layer uses the AVC standard for coding, and the coding resolution is the subpicture resolution "CIF". The enhanced layer uses the SVC standard for coding, and the number of enhanced coding layers is determined according to these criteria: The resolution is greater than the common highest capability, and at least two resolution clusters supported by the terminal exist. Therefore, the number of enhanced coding layers is 1, and the resolution of enhanced layer 1 is 4CIF. For terminal 2, the elementary layer uses the AVC standard for coding, and the coding resolution is the subpicture resolution (namely, CIF), and no enhanced layer exists.

Step 3: Each terminal encodes the image according to the received coding mode, and sends the coded streams to the MCU. That is, terminal 1, terminal 3, and terminal 4 send SVC code streams, and terminal 2 sends AVC code streams.

Step 4: After receiving the code streams transmitted by each terminal, the MCU transcodes the code streams according to the decoding capability and display requirements of the terminal, and sends them. That is, because terminals 1 and 2 do not need to display small pictures, the processing of the code streams directed to terminals 1 and 2 is the same as the processing in the second embodiment, namely, the code streams (AVC code streams) transmitted by terminal 2 are sent to terminal 1 directly; among the code streams (SVC code streams) transmitted by terminal 3, the elementary-layer AVC code streams are selected and sent to terminal 2.

Because terminal 3 needs to display the combo picture, the MCU may decode the selected elementary-layer AVC code streams transmitted by terminal 1, AVC code streams transmitted by terminal 2, and elementary-layer AVC code streams transmitted by terminal 4. The MCU combines the decoded streams into a large picture, encodes the large picture to obtain an elementary-layer AVC code stream, and sends it to terminal 3.

Step 5: Each terminal in the multipicture videoconference system decodes the received code streams. For terminal 3 that needs to display combo pictures, the received elementary-layer code streams of the combo picture are decoded.

By using the method for controlling a multipoint conference control, which is provided in this embodiment, the system can include both the terminal supporting the layering protocol and the terminal supporting no layering protocol, the calculation is reduced, and the system efficiency is improved.

Figure 3:
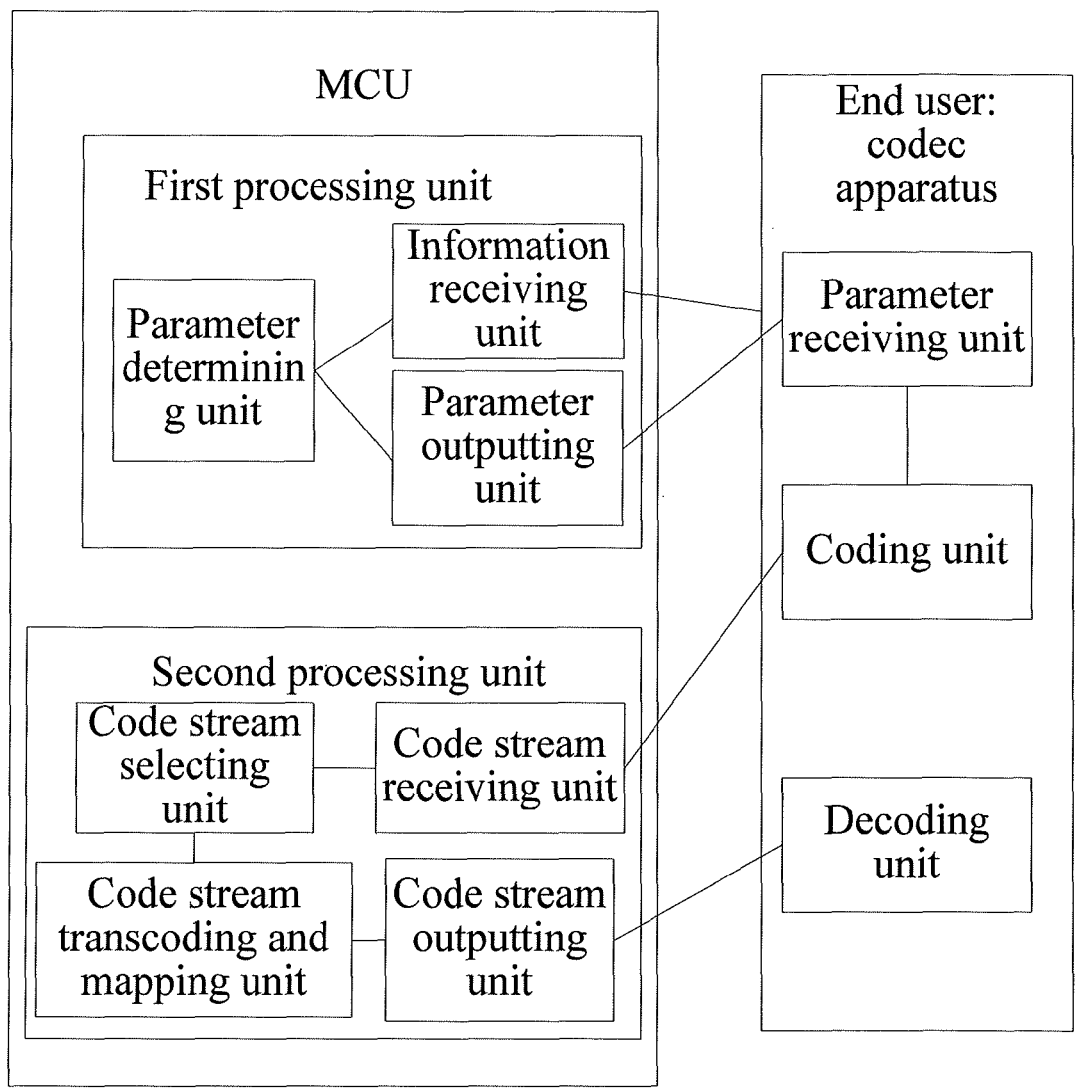
FIG. 3 shows a structure of the fourth embodiment.

The fourth embodiment is a multipoint conference system. As shown in FIG. 3, the system includes an MCU and a codec apparatus set in the terminal. The MCU is configured to:

determine resolution-layered coding parameters of each terminal, and send them to the first processing unit of each terminal respectively;

select the code streams to be displayed by each terminal among the received code streams, and transcode or map the selected code streams to the code streams decodable by the terminal; and send the code streams decodable by each terminal to the second processing unit of each terminal respectively.

The first processing unit includes: an information receiving unit, a parameter determining unit, and a parameter sending unit.

The information receiving unit is configured to receive display requirements and resolution capability information of each terminal.

The parameter determining unit includes a first parameter determining unit and/or a second parameter determining unit.

The first parameter determining unit is applied in ordinary videoconference applications, and is configured to: determine the common highest resolution of the decoding resolutions of all terminals as an elementary-layer resolution according to each terminal's display requirements and resolution capability information received by the information receiving unit, and determine the resolution-layered coding parameters of each terminal. The resolution-layered coding parameters may be determined in this way: For the terminal whose resolution is equal to the common highest capability, it is determined that a coding protocol of the terminal is the elementary-layer coding protocol, and the coding resolution is the elementary-layer resolution. For the terminal whose resolution is higher than the common highest capability and that is incapable of layered coding, it is determined that a coding protocol of the terminal is the elementary-layer coding protocol, and the coding resolution is the elementary-layer resolution. For the terminal whose resolution is higher than the common highest capability and that is capable of layered coding, it is determined that a coding protocol of the terminal is the layered coding protocol, the elementary-layer coding resolution is the elementary-layer resolution, and the enhanced-layer parameters are determined. The enhanced-layer parameters may be determined according to these criteria: The resolution is greater than the elementary-layer resolution, at least two resolutions supported by the terminal exist, and each resolution corresponds to an enhanced layer; and/or, the resolutions are clustered, and each clustered resolution corresponds to an enhanced layer.

The second parameter determining unit is applied in a multipicture videoconference system, and configured to: determine subpicture resolution and combo picture resolution according to the resolution capability information and display requirements of each terminal, and determine the resolution-layered coding parameters of each terminal. The resolution-layered coding parameters may be determined in this way: In a multipicture videoconference system, for the terminal whose resolution is equal to the subpicture resolution, it is determined that a coding protocol of the terminal is the elementary-layer coding protocol, and the coding resolution is the subpicture resolution; for the terminal whose resolution is higher than the subpicture resolution and that is incapable of layered coding, it is determined that a coding protocol of the terminal is the elementary-layer coding protocol, and the coding resolution is the subpicture resolution; for the terminal whose resolution is higher than the subpicture resolution and that is capable of layered coding, it is determined that a coding protocol of the terminal is the layered coding protocol, the elementary-layer coding resolution is the subpicture resolution, and the enhanced-layer parameters are determined. The enhanced-layer parameters may be determined according to these criteria: The resolution is greater than the elementary-layer resolution, at least two resolutions supported by the terminal exist, and each resolution corresponds to an enhanced layer; and/or, the resolutions are clustered, and each clustered resolution corresponds to an enhanced layer.

The parameter sending unit is configured to send each terminal's resolution-layered coding parameters determined by the parameter determining unit to the corresponding terminals of the parameters.

The second processing unit includes: a code stream receiving unit, a code stream selecting unit, a code stream transcoding or mapping unit, and a code stream sending unit.

The code stream receiving unit is configured to receive the code streams sent by each terminal.

The code stream selecting unit is configured to select the code streams to be displayed by each terminal among the received code streams.

The code stream transcoding or mapping unit is configured to transcode or map the code streams selected by the code stream selecting unit to the code streams decodable by the terminal. The code stream transcoding or mapping unit includes: a first transcoding or mapping unit, and/or a second transcoding or mapping unit, and/or a third transcoding or mapping unit.

The first transcoding or mapping unit is applied in ordinary videoconference scenarios, and configured to:

for the terminal whose resolution is equal to the elementary-layer resolution, select the elementary-layer code streams to be decoded;

for the terminal whose resolution is higher than the elementary-layer resolution and that is capable of layered decoding, select the elementary-layer code streams to be decoded and the enhanced-layer code streams to be decoded; or, transcode or map the layered code streams that include the elementary layer and the enhanced layer to the code streams of the elementary-layer coding standard; and for the terminal whose resolution is higher than the elementary-layer resolution and that is incapable of layered decoding, select the elementary-layer code streams to be decoded; or, transcode or map the layered code streams that include the elementary layer and the enhanced layer to the code streams of the elementary-layer coding standard.

The second transcoding or mapping unit is applied in the multipicture video scenarios, and configured to: combine the selected code stream(s) for decoding into an elementary-layer code stream directly; and/or decode the selected code stream(s), combine the decoded pictures into a large picture, and encode the large picture to obtain an elementary-layer code stream.

The third transcoding or mapping unit is applied in the multipicture videoconference scenarios, and is configured to: select the subpicture code streams to be decoded and enhanced-layer code streams to be decoded for the terminal capable of layered decoding; or, transcode or map the layered code streams that include the subpicture code streams and the enhanced-layer code streams to the code streams of the elementary-layer coding standard; and transcode or map the layered code streams that include the subpicture code streams and the enhanced-layer code streams to the code streams of the elementary-layer coding standard for the terminal incapable of layered decoding.

The code stream sending unit is configured to send the transcoded or mapped code streams to their corresponding terminals.

The codec apparatus includes:

a parameter receiving unit, configured to receive resolution-layered coding parameters;

a coding unit, configured to: perform resolution-layered coding on an image to be sent according to the resolution-layered coding parameters received by the parameter receiving unit, and send the coded streams; and a decoding unit, configured to decode the received code streams.

The multipoint conference system provided in this embodiment can include both the terminal supporting the layering protocol and the terminal supporting no layering protocol, thus reducing calculation and improving the system efficiency.

Through the descriptions of the preceding embodiments, those skilled in the art may understand that the methods and systems recited in the claims may be implemented by using hardware only or by using software and a necessary universal hardware platform. Based on such understandings, the technical solution may be embodied in the form of a software product. The software product may be stored in a nonvolatile storage medium, which can be a Compact Disk Read-Only Memory (CD-ROM), Universal Serial Bus (USB) flash drive, or a removable hard drive. The software product includes a number of instructions that enable a computer device (personal computer, server, or network device) to execute the methods provided in the embodiments.

In conclusion, the above are merely preferred embodiments. However, the scope of the claims is not limited thereto. Changes or replacements readily apparent to persons skilled in the prior art within the technical scope of the claims are understood to fall within the scope of the claims.

What is claimed is:

1. A method for controlling a multipoint conference, comprising:
   determining resolution-layered coding parameters of each terminal of a plurality of terminals, and sending the resolution-layered coding parameters to a corresponding terminal; and
   receiving code streams sent by each terminal;
   selecting a code stream to be displayed by each terminal among the received code streams according to display requirements of each terminal;
   transcoding or mapping the selected code stream to a code stream decodable by the corresponding terminal; and
   sending the decodable code stream to the corresponding terminal.

2. The method according to claim 1, wherein determining the resolution-layered coding parameters of each terminal comprises:
   determining an elementary-layer resolution of each terminal; and
   determining the resolution-layered coding parameters of each terminal according to the determined elementary-layer resolution.

3. The method according to claim 2, wherein determining the elementary-layer resolution of each terminal comprises:
   receiving terminal resolution capability information communicated from each terminal;
   determining that a common highest resolution of decoding resolutions of the plurality of terminals is the elementary-layer resolution according to each terminal's resolution capability information received.

4. The method according to claim 2, wherein determining the elementary-layer resolution of each terminal comprises:
   presetting the elementary-layer resolution that is not higher than a highest decoding resolution of the plurality of terminals.

5. The method according to claim 2, wherein determining the resolution-layered coding parameters of each terminal according to the determined elementary-layer resolution of each terminal comprises:
   determining, for a first terminal with a resolution equal to the elementary-layer resolution, that a coding protocol of the first terminal is an elementary-layer coding protocol, and a coding resolution is the elementary-layer resolution; and
   determining, for a second terminal with a resolution higher than the elementary-layer resolution and that is incapable of layered coding, that a coding protocol of the second terminal is the elementary-layer coding protocol, and the coding resolution is the elementary-layer resolution; and
   determining, for a third terminal with a resolution higher than the elementary-layer resolution and that is capable of layered coding, that a coding protocol of the third terminal is a layered coding protocol, and an elementary-layer coding resolution is the elementary-layer resolution, and determining enhanced-layer parameters.

6. The method according to claim 5, wherein transcoding or mapping the selected code stream to code stream decodable by the corresponding terminal comprises:
   selecting, for the first terminal, elementary-layer code streams to be decoded;
   selecting, for the third terminal, the elementary-layer code streams to be decoded and enhanced-layer code streams to be decoded; or, transcoding or mapping, for the third terminal, layered code streams that comprise an elementary layer and an enhanced layer to the code streams of an elementary-layer coding standard; and
   selecting, for the second terminal, the elementary-layer code streams to be decoded; or, transcoding or mapping the layered code streams that comprise the elementary layer and the enhanced layer to the code streams of the elementary-layer coding standard.

7. The method according to claim 5, wherein determining the enhanced-layer parameters comprises:
   determining the enhanced-layer parameters according to whether a) the resolution is greater than the elementary-layer resolution, b) at least two resolutions supported by the terminal exist, and c) each resolution corresponds to an enhanced layer; and/or
   clustering the resolution, wherein each clustered resolution corresponds to an enhanced layer.

8. The method according to claim 1, wherein determining the resolution-layered coding parameters of each terminal comprises:
   receiving the resolution capability information sent by each terminal;
   determining a subpicture resolution and a combo picture resolution according to the resolution capability information and the display requirements; and
   determining the resolution-layered coding parameters of each terminal according to the subpicture resolution and the combo picture resolution.

9. The method according to claim 8, wherein determining the resolution-layered coding parameters of each terminal according to the subpicture resolution and the combo picture resolution comprises:
   determining, for a first terminal with a resolution that is equal to the subpicture resolution, that a coding protocol of the first terminal is an elementary-layer coding protocol, and the coding resolution is the subpicture resolution;
   determining, for a second terminal with a resolution that is higher than the subpicture resolution and that is incapable of layered coding, that a coding protocol of the second terminal is the elementary-layer coding protocol, and the coding resolution is the subpicture resolution; and
   determining, for a third terminal with a resolution that is higher than the subpicture resolution and that is capable of layered coding, that a coding protocol of the third terminal is a layered coding protocol, the elementary-layer coding resolution is the subpicture resolution, and the enhanced-layer coding resolution is the combo picture resolution, and determining enhanced-layer parameters.

10. The method according to claim 8, wherein transcoding or mapping the selected code stream to code stream decodable by the corresponding terminal comprises:
    selecting, for a terminal capable of layered decoding, subpicture code streams to be decoded and enhanced-layer code streams to be decoded; or, transcoding or mapping, for the terminal capable of layered decoding, layered code streams that comprise the subpicture code streams and the enhanced-layer code streams to the code streams of an elementary-layer coding standard; and
    transcoding or mapping, for a terminal incapable of layered decoding, the layered code streams that comprise the subpicture code streams and the enhanced-layer code streams to the code streams of the elementary-layer coding standard.

11. The method according to claim 1, wherein transcoding or mapping the selected code stream to code stream decodable by the corresponding terminal comprises:
    combining one or more selected code streams to be decoded into an elementary-layer code stream;
    decoding the one or more selected code streams to be decoded;
    combining decoded pictures into a large picture; and
    encoding the large picture to obtain an elementary-layer code stream.

12. A Multipoint Control Unit (MCU), comprising:
    a first processing unit, configured to determine resolution-layered coding parameters of each terminal of a plurality of terminals, and send the resolution-layered coding parameters to a corresponding terminal of the plurality of terminals; and
    a second processing unit configured to select a code stream to be displayed by each terminal among received code streams, and transcode or map the selected code stream to code stream decodable by the corresponding terminal, and send the decodable code stream to the corresponding terminal.

13. The MCU according to claim 12, wherein the first processing unit comprises:
an information receiving unit, configured to receive display requirements and resolution capability information of each terminal;
a parameter determining unit configured to determine a common highest resolution of decoding resolutions of the plurality of terminals as an elementary-layer resolution according to each terminal's display requirements and resolution capability information received by the information receiving unit; or determine resolution-layered coding parameters of each terminal according to the resolution capability information and each user's display requirements; and
a parameter sending unit, configured to send each terminal's resolution-layered coding parameters determined by the parameter determining unit to the corresponding terminals of the parameters.

14. The MCU according to claim 12, wherein the second processing unit comprises:
a code stream selecting unit;
a code stream transcoding or mapping unit; and
a code stream sending unit,
wherein the code stream selecting unit is configured to select the code stream to be displayed by each terminal among the received code streams, and
wherein the code stream transcoding or mapping unit is configured to transcode or map the code stream selected by the code stream selecting unit to the code stream decodable by the corresponding terminal, wherein the code stream transcoding or mapping unit further comprises:
first, second, and third transcoding or mapping subunits;
wherein the first transcoding or mapping subunit is configured to
select elementary-layer code streams to be decoded for a terminal with a that is equal to an elementary-layer resolution;
select the elementary-layer code streams to be decoded and enhanced-layer code streams to be decoded for a terminal with a resolution that is higher than the elementary-layer resolution and that is capable of layered decoding; or, transcode or map layered code streams that comprise an elementary layer and an enhanced layer to code streams of an elementary-layer coding standard; and
select the elementary-layer code streams to be decoded for a terminal with a resolution that is higher than the elementary-layer resolution and that is incapable of layered decoding; or, transcode or map the layered code streams that comprise the elementary layer and the enhanced layer to the code streams of the elementary-layer coding standard;
wherein the second transcoding or mapping subunit is configured to:
combine one or more selected code streams for decoding into an elementary-layer code stream directly;
decode the one or more selected code streams
combine decoded pictures into a large picture, and
encode the large picture to obtain an elementary-layer code stream; and
wherein the third transcoding or mapping subunit is configured to:
select subpicture code streams to be decoded and enhanced-layer code streams to be decoded for the terminal capable of layered decoding;
transcode or map layered code streams that comprise the subpicture code streams and the enhanced-layer code streams to the code streams of the elementary-layer coding standard;
transcode or map the layered code streams that comprise the subpicture code streams and the enhanced-layer code streams to the code streams of the elementary-layer coding standard for the terminal incapable of layered decoding; and
wherein the code stream sending unit is configured to send the transcoded or mapped code streams to their corresponding terminals.

15. A multipoint conference system, comprising:
a Multipoint Control Unit (MCU), configured to determine resolution-layered coding parameters of each terminal of a plurality of terminals, and send the resolution-layered coding parameters to a corresponding terminal of the plurality of terminals, select a code stream to be displayed by each terminal among received code streams, and transcode or map the selected code stream to code stream decodable by the corresponding terminal, and send the decodable code stream to the corresponding terminal; and
a terminal, configured to perform resolution-layered coding on an image to be sent according to received resolution-layered coding parameters, and send the coded streams; and decode the received code streams.

16. The system according to claim 15, wherein the terminal comprises:
a parameter receiving unit, configured to receive the resolution-layered coding parameters;
a coding unit, configured to perform resolution-layered coding on the image to be sent according to the resolution-layered coding parameters received by the parameter receiving unit, and send the coded streams; and
a decoding unit, configured to decode the received code streams.

* * * * *